United States Patent [19]

Ou-Yang

[11] Patent Number: 4,503,123
[45] Date of Patent: Mar. 5, 1985

[54] INNER SEAL FOR CAPPED CONTAINERS

[75] Inventor: David T. Ou-Yang, Cottage Grove, Minn.

[73] Assignee: Minnesota Mining and Manufacturing Company, Saint Paul, Minn.

[21] Appl. No.: 524,873

[22] Filed: Aug. 22, 1983

[51] Int. Cl.³ .............................................. C09J 7/02
[52] U.S. Cl. .................................. 428/349; 206/807; 220/258; 428/344; 428/345; 428/354; 428/486; 428/467; 525/227
[58] Field of Search ............... 428/343, 344, 345, 354, 428/485, 355, 347, 349, 350, 486, 467; 220/258; 206/807; 525/227

[56] References Cited

U.S. PATENT DOCUMENTS

| | | |
|---|---|---|
| 2,376,899 | 5/1945 | Bulatkin .............................. 428/485 |
| 2,733,225 | 1/1956 | Smith .................................. 428/485 |
| 2,833,671 | 8/1958 | Funk et al. ........................... 428/485 |
| 4,247,663 | 1/1981 | Yoshiga et al. ...................... 525/227 |
| 4,291,090 | 9/1981 | Kenji et al. .......................... 524/558 |
| 4,327,147 | 4/1982 | Ou-Yang ............................. 428/355 |
| 4,365,029 | 12/1982 | Reizer et al. ........................ 525/227 |
| 4,398,644 | 8/1983 | Claude ................................ 428/355 |
| 4,408,015 | 10/1983 | Flatau ................................. 525/227 |

Primary Examiner—George F. Lesmes
Assistant Examiner—E. Rollins Buffalow
Attorney, Agent, or Firm—Donald M. Sell; James A. Smith; Richard E. Brink

[57] ABSTRACT

Tamper-resistant inner seals that bond firmly to the lips of lidded and capped glass and plastic containers incorporate an aluminum foil having a heat-sealable adhesive that is a blend of an acrylate polymer and a vinyl polymer. HCl scavengers, plasticizers, and PVC heat stabilizers are preferably included.

9 Claims, 3 Drawing Figures

INNER SEAL FOR CAPPED CONTAINERS

BACKGROUND OF THE INVENTION

This invention relates to sheet material having a heat-sealable stratum, and is especially concerned with sheet material useful in the manufacture of tamper-resistant seals for capped bottles or jars.

For several years a number of products packaged in bottles or jars having screw-on lids or caps have been provided with an additional membrane-like seal that protects the contents when the cap or lid is removed. This membrane, which is approximately the same diameter as the outer diameter of the container mouth, is adhered to the lip of the container and cannot be removed without evidence of tampering. Additionally, this inner seal excludes air from the contents of the opened container and helps prevent leakage of packaged liquids.

Because of its simplicity of application, one highly commercial form of inner seal includes a layer of pulpboard bonded with microcrystalline wax to an aluminum foil, the exposed surface of the foil being provided with a heat-sealable coating which is tack-free at room temperature. In use, the pulpboard backing is permanently glued to the inner upper surface of a threaded cap or lid, which is then mounted on the complementarily threaded mouth of a filled container. The cap is then passed through an induction heating unit, which rapidly heats the aluminum foil, simultaneously melting the microcrystalline wax and the heat-sealable coating. The melted wax is quickly absorbed by the pulpboard backing, greatly reducing the strength of bond between the backing and the aluminum foil, so that when the cap or lid is removed, the pulpboard backing remains inside the cap or lid, while the aluminum foil remains firmly sealed to the mouth of the container. Details of this process are set forth in considerable detail in U.S. Pat. No. 2,937,481.

Although the structure just described has been used with great effectiveness on containers formed from polyvinyl chloride, polyester, polyethylene, polypropylene and acrylonitrile:methylacrylate copolymers, it has been much more difficult to obtain satisfactory bonds to glass containers. Prior to the present invention, the heat-sealable adhesives for bonding to glass have included ethylene:vinyl acetate copolymers, polyester resins, and polyionomer resins, available from E. I. duPont de Nemours & Co. under the trade designation "Surlyn". While all of these adhesives are capable of being heat sealed to glass containers, the bond is weak enough that the inner seal can be peeled away without difficulty. As a result, it is believed that no one has heretofore been able to achieve a firmly bonded metal foil inner seal on glass containers.

BRIEF DESCRIPTION

The present invention provides induction type inner seals which bond so firmly to glass containers, as well as to most polymeric containers, that they cannot be peeled away without leaving evidence that tampering has occurred.

An inner seal in accordance with the present invention is a composite sheet material adapted for tamper-resistance on glass and polymeric containers, comprising a layer of aluminum foil to one face of which is bonded a stratum of heat-sealable adhesive that constitutes an exposed surface of the sheet material. This adhesive, which is substantially tack free at room temperature, comprises 100 parts by weight of an intimate blend of (a) about 5–70 parts by weight (preferably about 10–15 parts by weight) of an acrylate polymer formed from monomeric acrylate units selected from the class consisting of methyl acrylate and ethyl acrylate and (b) about 25–85 parts by weight (preferably about 70–80 parts by weight) of a vinyl polymer having a number average molecular weight of about 8,000–40,000 (preferably about 15,000–25,000) and formed from monomeric vinyl units of which at least about 60 weight percent are vinyl chloride, the total of (a) plus (b) equaling at least about 65, and preferably at least about 80, parts by weight. Preferably the adhesive additionally contains effective amounts of HCl scavenger, such as an epoxidized triglyceride, and heat stabilizer, such as dioctyl tin bis(iso-octyl mercaptoacetate). Where appropriate, plasticizers may also be included.

As sold to manufacturers of products packaged in lidded or capped containers, the other face of the aluminum foil is bonded to a pulpboard backing by means of microcrystalline wax.

To emphasize the specific nature of the invention, it is pointed out that the products just described are essentially identical to those of the prior art except for the type of heat-sealable adhesive composition employed.

BRIEF DESCRIPTION OF THE DRAWING

Understanding of the invention will be enhanced by referring to the accompanying drawing, in which like numbers refer to like parts in the several views and in which.

DETAILED DESCRIPTION

Figure 1:
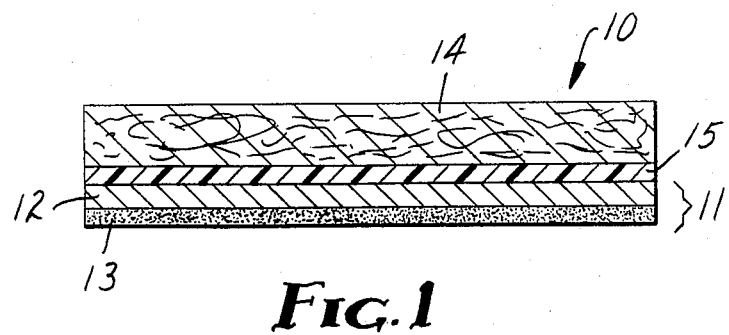
FIG. 1 is a greatly enlarged cross section of sheet material made in accordance with the invention.
Figures 2, 3:
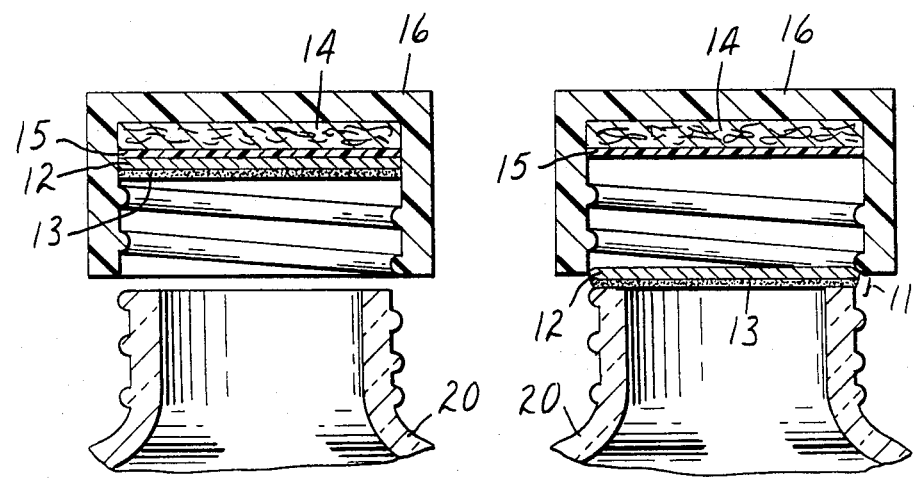
FIG. 2 is a cross sectional view of a screw-on cap having a circle of the product of FIG. 1 bonded to the lower surface of the cap, which is positioned above a container (only the upper portion of which is shown) prior to installing the cap on the mouth of the container.
FIG. 3 is similar to FIG. 2 but shows the result of heat sealing the mouth of the container and subsequently removing the cap.

Referring to the drawings in greater detail, composite sheet material 10 comprises inner seal 11, which in turn comprises metal foil backing 12 and heat-sealable adhesive 13. Metal foil 12 is adhered to pulpboard backing 14 by means of microcrystalline wax 15. FIG. 2 shows composite sheet material 10 mounted inside screw-on top 16, pulpboard backing 14 being bonded by an adhesive (not shown) to the lower inside surface of cap 16. After container 20 has been filed cap 16 is screwed into the mouth of container 20, after which the capped container is passed through a radio frequency field, the resulting eddy currents inductively heating metal foil 12 and simultaneously melting wax layer 15 and heat-sealable adhesive layer 13. As wax 15 melts, it is absorbed by pulpboard backing 14, greatly weakening the bond between backing 14 and metal foil 12. As the capped container cools to room temperature, heat-sealable adhesive 13 bonds firmly to the lip of container 20. When cap 16 is subsequently unscrewed from container 20, pulpboard backing 14 twists free from foil 12, which remains firmly bonded to the lip of container 20 by means of heat-sealable adhesive 13, thereby providing a tight seal which prevents leakage. Because foil 12 tears when subjected to peeling forces, it also provides an indication that tampering may have occurred.

Preferably cap 16 is formed of a polymeric material not subject to heating when exposed to a radio frequency field, but a metallic top coated with a heat-resistant organic finish may also be employed.

The invention will now be illustrated by means of specific examples, in which all parts, percentages, and ratios are by weight unless otherwise noted.

EXAMPLE 1

To an 80:20 methylethylketone:toluene solvent blend was gradually added a nominally 83:16:1 vinyl chloride:vinyl acetate:maleic acid terpolymer (commercially available from Union Carbide under the trade designation "Bakelite" VMCC), with vigorous agitation, until a 32% solids solution was obtained. The inherent viscosity of the terpolymer was 0.38 when measured in accordance with ASTM Test D-1243, and its number average molecular weight was 15,000. To 78.4 parts of this solution (25.1 parts solids) was added 13.0 parts of a 40% toluene solution (5.2 parts solids) of a methylacrylate polymer having a $T_g$ of 5° C. (commercially available from Rohm & Haas under the trade designation "Acryloid" C-10LV), 7.5 parts of epoxidized linseed oil having an oxirane oxygen content of at least 9.0 and a viscosity of 6.0-8.5 stokes (commercially available from Viking Chemical Company under the trade designation "Vikoflex" 7191), and 1.1 parts of dioctyl tin bis(iso-octylmercaptoacetate) PVC heat stabilizer (commercially available from M & T Chemicals Inc. under the trade designation "Thermolite" 831). The final solution of heat-sealable adhesive, containing 38.8% solids, was then gravure roll coated on one face of 25-micrometer aluminum foil in an amount equal to approximately 30 g/m² and the solvent evaporated in a 93° C. oven utilizing impingement air flow of heat-sealable adhesive to leave a coating weighing approximately 12 g/m².

As is conventional, the other face of the aluminum foil was then roll coated with molten (110° C.) microcrystalline wax and cooled, leaving a coating weight of about 130 g/m². The wax-coated surface was then placed in contact with the surface of a pulpboard sheet and passed through squeeze rolls at a temperature of 55° C., thereby laminating the aluminum foil to the pulpboard while leaving the heat-sealable adhesive layer exposed. The resultant inner seal construction was then slit to suitable widths, from which circular discs, corresponding to the inner diameter of screw-on lids, were die-cut. A suitable adhesive was then employed, in conventional manner, to bond the pulpboard face of one of these discs to the inner surface of the screw-on cap for a glass jar.

The lid is screwed onto a glass jar using an appropriate torque; for example, with a glass jar having a 38-mm i.d. The jar is then passed through a radio frequency field adjacent the lid for about 0.7-1.0 second, which is sufficient to bond the aluminum foil to the lip, simultaneously melting the microcrystalline wax, which diffuses into the pulpboard and weakens the bond between the foil and the pulpboard. The sealed jar is then cooled to room temperature. When the cap is unscrewed, the pulpboard remains attached to the lid, while the foil remains firmly bonded to the lip of the jar. Any attempt to remove the foil causes it to tear and provides visual evidence of tampering. Equally satisfactory results are obtained with snap-on lids and with polymeric jars.

As is well known in the inner seal art, the combination of the various sheets and foils in the foregoing example represents only one specific construction. To illustrate, the aluminum foil may be prelaminated to a sheet of paper, the pulpboard may be prelaminated to a polyester film, etc.

The epoxidized linseed oil in Example 1 performs the dual functions of plasticizing the heat-sealable adhesive and scavenging any HCl that is volatilized when adhesive is subjected to heating. Other epoxidized substances, such as epoxidized soybean oil, can be used for the same purpose. The liquid organo-tin stabilizer incorporated in Example 1 also serves to inhibit the degradation of polyvinyl chloride in the presence of heat, while simultaneously imparting some plasticizing effect; up to about 10% stabilizer may be included. If heat stabilization is not considered critical in the specific application, or if no HCl scavenger is required, more conventional plasticizers can be incorporated, e.g., polyesters such as "Santicizer" 334-F, butylbenzyl phthalate such as "Santicizer" 160, dialkyl adipate such as "Santicizer" 97, and 2 ethylhexyldiphenyl phosphate such as "Santicizer" 141; all the "Santicizer" products are available from Monsanto Chemical Company. In most cases 3-30% plasticizer has proved useful, the higher amounts of plasticizer improving wetting of the surfaces to be bonded. If, as will be the case in some applications, the blend of acrylate polymer and vinyl copolymer and terpolymer is sufficiently flexible, it will not be necessary to add plasticizers of any type.

EXAMPLES 2-7

Considerable variation in the ratio of the various components is possible, as is shown in the tabulated examples below, each of which performed at least acceptably. The method of manufacture in each case was the same as in Example 1.

| | Parts by weight of each component | | | | |
|---|---|---|---|---|---|
| Example | VMCC vinyl polymer | C-10LV methyl acrylate polymer | "Vikoflex" 7191 HCl scavenger | "Thermolite" heat stabilizer | Performance compared to Example 1 |
| 2 | 81.0 | 5.7 | 11.0 | 2.3 | slightly lower adhesion |
| 3 | 76.7 | 16.0 | 3.7 | 3.6 | appreciably lower adhesion |
| 4 | 64.6 | 13.8 | 19.8 | 0 | adhesive discolors |
| 5 | 61.1 | 12.7 | 18.2 | 8.0 | increased opacity |
| 6 | 56.8 | 11.8 | 28.5 | 2.9 | decreased adhesive strength |
| 7 | 28.2 | 56.4 | 8.5 | 6.8 | decreased adhesion |

EXAMPLE 8

A product was prepared in substantially the same manner as in Example 1, utilizing s polyester plasticizer having no HCl scavenging function. The final solids weight ratio was 12.5:74.6:11.9:1.0 methyl acrylate polymer:vinyl terpolymer:polyester plasticizer:di-octyl tin bis(iso-octyl-mercaptoacetate) heat stabilizer. The product of this example performed substantially as well as that of Example 1, but some odor of HCl was detected after the heat sealing operation had been completed.

EXAMPLE 9

A product substantially similar to that of Example 1 was prepared except that the vinyl chloride polymer was a 70:25:5 polyvinyl chloride:maleate ester:maleic acid terpolymer, commercially available from Occidental Chemical Company under the trade designation "FPC 470". The weight ratio of components, on a solids basis, was 23.8:59.5:14.9:1.8 methyl acrylate polymer:-polyvinyl chloride terpolymer:epoxidized soybean oil:-di-octyl tin bis(isooctylmercaptoacetate). Results were substantially the same as obtained in Example 1, except that the adhesive was somewhat tackier because of the lower $T_g$ of the vinyl chloride polymer.

EXAMPLE 10

A 66.7:33.3 (solids basis) solution of a heat-sealable polymer was obtained by blending appropriate amounts of a 30% toluene solution of methyl acrylate polymer and a 20% methylethylketone solution of "FPC 470". When incorporated in the structure of Example 1, effective adhesion was obtained to both glass and plastic surfaces, although it was found that the inner seal could be peeled more easily than in the case of Example 1. It is considered that this type of product would be suitable for general chemical use but would probably not be desired for packaging pharmaceuticals or food products.

EXAMPLE 11

Example 10 was repeated, substituting a 20% toluene solution of ethylene:vinyl acetate copolymer, commercially available from E. I. duPont de Nemours & Co. under the trademark designation "Elvax" 150. Results were substantially the same as in the case of Example 4.

EXAMPLE 12

Using the general procedures of preceding examples, a 32.3:48.4:19.3 (solids basis) solution of a heat-sealable adhesive was obtained by blending appropriate amounts of a 40% toluene solution of methyl acrylate polymer ("Acryloid" C10-LV), a 40% methylethylketone solution of polyvinyl chloride:maleate ester:maleic acid terpolymer ("Bakelite" VMCC), and a 40% toluene solution of alpha-methyl styrene (commercially available from Hercules Incorporated under the trade designation "Kristalex" 3070). Performance results were substantially the same as in Examples 9, 10, and 11.

EXAMPLE 13

Example 1 was repeated except that the adhesive was formulated from 74.0 parts VMCC vinyl polymer (23.68 parts solids), 24.7 parts of a 60:40 ethyl acetate:-methanol solution of a proprietary ethyl acrylate polymer (5.84 parts solids), 1.2 parts "Vikoflex" 7191, and 0.1 part "Thermolite" 831. Results were comparable to those of Example 1.

EXAMPLES 14 AND 15

A 35% solids ethyl acetate solution of a 45:55 methyl acrylate:ethyl acrylate copolymer, having an inherent viscosity of 1.33, measured at 35% solids in ethyl acetate, was obtained. Using the same method of formulating heat-sealable adhesives as in previous examples, the compositions tabulated below were prepared and evaluated.

| | Parts by weight of each component | | | |
|---|---|---|---|---|
| Example | VMCC vinyl polymer | Ethyl acrylate copolymer | "Vikoflex" 7191 HCl scavenger | "Thermolite" 831 heat stabilizer |
| 14 | 69.3 | 6.5 | 20.6 | 3.6 |
| 15 | 38.5 | 42.0 | 15.2 | 3.8 |

Results were comparable to those of Example 1. Because ethyl acrylate is considered toxic, the products of these examples are unsuited for the packaging of food products or pharmaceuticals but would be acceptable for the packaging of chemicals, etc., where the primary purpose of the inner seal is to prevent leakage.

In addition to the vinyl chloride polymers previously mentioned, the following have also been found to be satisfactory: 81:8:11 vinyl chloride:vinyl acetate:hydroxypropyl acrylate terpolymer having a number average molecular weight of about 26,000 (commercially available from Occidental Chemical Corporation under the trade designation "FPC-413"), 85:15 vinyl chloride:vinyl acetate copolymer having a number average molecular weight of about 24,000 (commercially available from Occidental Chemical Corporation under the trade designation "FPC-497"), 86:13:1 vinyl chloride:vinyl acetate:maleic acid terpolymer having a number average molecular weight of approximately 21,000 (commercially available from Union Carbide under the trade designation "Bakelite" VMCH), and 91:3:6 vinyl chloride:vinyl acetate:vinyl alcohol terpolymer having a number average molecular weight of approximately 23,000 (commercially available from Union Carbide under the trade designation "Bakelite" VAGH).

The heat-sealable compositions disclosed can be further modified, if desired, to impart specific properties. For example, up to 25% of a low molecular weight styrene derivatives, such as "Kristalex" may be added to decrease the viscosity of high solids or high viscosity solutions, to facilitate coating.

Heat stability of the heat-sealable adhesive may be improved by replacing part of the vinyl chloride polymer with ethylene:vinyl acetate copolymer, although a decrease of adhesion occurs as a result.

What I claim is as follows:

1. Composite sheet material adapted for tamper-resistant heat sealing of jars, bottles, and the like, comprising a layer of aluminum foil to one face of which is bonded a stratum of heat-sealable adhesive that constitutes an exposed surface of the sheet material and is substantially tackfree at room temperature, said adhesive comprising 100 parts by weight of an intimate blend of (a) about 5–70 parts by weight of an acrylate polymer formed from monomeric acrylate units selected from the class consisting of methyl acrylate and ethyl acrylate and (b) about 25–85 parts by weight of a vinyl polymer having a number average molecular weight of about 8,000–40,000 and formed from monomeric vinyl units of which at least about 60 weight percent are vinyl chloride, the total of (a)+(b) equaling at least about 65 parts by weight.

2. The sheet material of claim 1 wherein the number average molecular weight of the vinyl polymer is in the range of about 15,000–25,000.

3. The sheet material of claim 2 wherein an HCl scavenger is included in the adhesive.

4. The sheet material of claim 3 wherein the HCl scavenger is an epoxidized triglyceride.

5. The sheet material of claim 3 wherein a heat stabilizer is included in the adhesive.

6. The sheet material of claim 5 wherein the heat stabilizer is dioctyl tin bis(iso-octyl mercaptoacetate).

7. The sheet material of claim 6 wherein the other face of the aluminum foil is bonded to paper pulpboard with microcrystalline wax.

8. The sheet material of claim 7 wherein the vinyl polymer is an 83:16:1 vinyl chloride:vinyl acetate:maleic acid terpolymer.

9. The sheet material of claim 8 wherein about 8-10 parts by weight of epoxidized soybean oil is present as the HCl scavenger and about 1-2 parts by weight of dioctyl tin bis(iso-octylmercaptoacetate) is present as the heat stabilizer.

* * * * *